United States Patent [19]

Schumacher

[11] 4,376,554

[45] Mar. 15, 1983

[54] IMPLEMENT WHEEL

[75] Inventor: William G. Schumacher, Elgin, Ill.

[73] Assignee: International Harvester Co., Chicago, Ill.

[21] Appl. No.: 228,042

[22] Filed: Jan. 26, 1981

[51] Int. Cl.³ .............................................. B60B 1/06
[52] U.S. Cl. .............................. 301/63 DD; 301/110; 301/114; 403/26
[58] Field of Search ............. 301/63 DS, 63 DD, 109, 301/110, 111, 114–117, 5.7, 63 DT; 295/43; 474/180–182; 308/16, 18, 19; 403/26

[56]  References Cited

U.S. PATENT DOCUMENTS

| | | | |
|---|---|---|---|
| 1,549,509 | 8/1925 | Schluesselburg | 301/5.7 |
| 2,187,777 | 1/1940 | Gannett | 301/63 DS |
| 3,533,662 | 10/1970 | Richards et al. | 301/63 DD |
| 3,909,065 | 9/1975 | Main | 301/63 DD |

FOREIGN PATENT DOCUMENTS 505525  5/1939  United Kingdom ................ 301/111

Primary Examiner—H. Grant Skaggs
Attorney, Agent, or Firm—John P. O'Brien; F. David Au Buchon

[57] ABSTRACT

An improved implement wheel includes two wheel halves permanently secured together, such as by welding. The first wheel half includes a bearing seat and the second wheel half includes a threaded nipple for receiving a bearing engagement member, such as a screw cap. A bearing is seated in the bearing seat defined in the first wheel half and is secured therein by the screw cap. The wheel bearing can be replaced easily by removing the screw cap, without necessitating wheel disassembly.

4 Claims, 4 Drawing Figures

IMPLEMENT WHEEL

BACKGROUND OF THE INVENTION

A. Field of the Invention

The present invention relates to a new and improved implement wheel and, more particularly, to a new and improved ground-engaging implement wheel for farm or agricultural equipment, such as tillage and planting equipment.

B. Description of the Prior Art

Ground engaging tillage and planting equipment and other agricultural implements rely on a series of rubber tired sheet metal wheels approximately 6 to 12 inches in diameter to position the equipment at a desired height above the ground. Typical examples of such tillage and planting equipment include metal plows, disc harrows and planting units. The wheels attached to this equipment are subject to high stresses, particularly in the wheel bearing location and replacement of the wheel bearings in such equipment frequently is required during the service life of the equipment.

Typical prior art implement wheels are constructed to include approximately 7 bolts circumferentially distributed around a wheel half to join the wheel halves together, to hold the wheel bearing in place, and to maintain the tire in position. If the bearing fails due to the aggressive working environment in which agricultural implements are employed, the bolts must be removed to separate wheel halves, the tire is removed, a new bearing is installed, the wheel halves are bolted together, and the tire is mounted on the wheel. This procedure requires a substantial amount of time and effort requiring substantially complete wheel removal and disassembly for wheel bearing replacement. Further, the construction of the described prior art implement wheel is relatively expensive and requires the manufacturer and user to inventory a relatively large number of parts because of the necessary mechanical fasteners. In addition, the component strength of the typical prior art implement wheel is not as high as desired since the wheel halves are held together by mechanical fasteners that are subject to rapid wear due to the high bending stresses imparted at the area of the mechanical fasteners during use of the implement. Further, most often the bearings must be replaced in the field where the agricultural implement is being used, and the removal of the mechanical fasteners and disassembly of the wheel for bearing replacement, as described, is very difficult.

SUMMARY OF THE INVENTION

An object of the present invention is to provide a new and improved wheel for agricultural implements and the like.

Another object of the present invention is to provide a new and improved implement wheel constructed for ease of removal and replacement of wheel bearings.

Another object of the present invention is to provide a new and improved wheel construction including an internally disposed wheel bearing capable of being removed without wheel disassembly, by removal of a single threaded cap.

A further object of the present invention is to provide a new and improved implement wheel that does not require mechanical fasteners to secure the wheel halves together.

A still further object of the present invention is to provide a new and improved implement wheel having increased strength.

The present invention is directed to a new and improved wheel particularly useful for agricultural equipment, such as ground-engaging tillage and planting equipment and the like, to position the equipment at a desired and consistent height above the ground. The wheel of the present invention generally includes first and second wheel halves permanently secured together, such as by welding or the like, and includes a wheel bearing seat defined on one of the wheel halves. The other wheel half is constructed to include an extending internally or externally threaded nipple so that a removable bearing-engaging screw cap can be secured tightly against the wheel bearing to secure the bearing precisely in the bearing seat.

In the construction of the implement wheel of the present invention, the wheel halves are rigidly secured together by welds and then the bearing is seated in the bearing seat defined on an inner surface of one of the wheel halves. The screw cap is then screwed onto the threaded portion of the second wheel half until tightly contacting a rotatable bearing race portion of the wheel bearing to fasten and mate the bearing precisely in position and to insure that the bearing remains precisely in the bearing seat during use of the equipment.

In an alternative embodiment, a threaded boss is secured by welding or the like to the second wheel half and the screw cap is threaded thereon. In both embodiments described, a set screw or thread adhesive, such as an anaerobic sealant, can be used to secure the screw cap to the threaded nipple to insure that the screw cap remains in its initially set position so that the wheel bearing remains properly seated until replacement is necessary.

DESCRIPTION OF THE PREFERRED EMBODIMENTS

Figure 1:
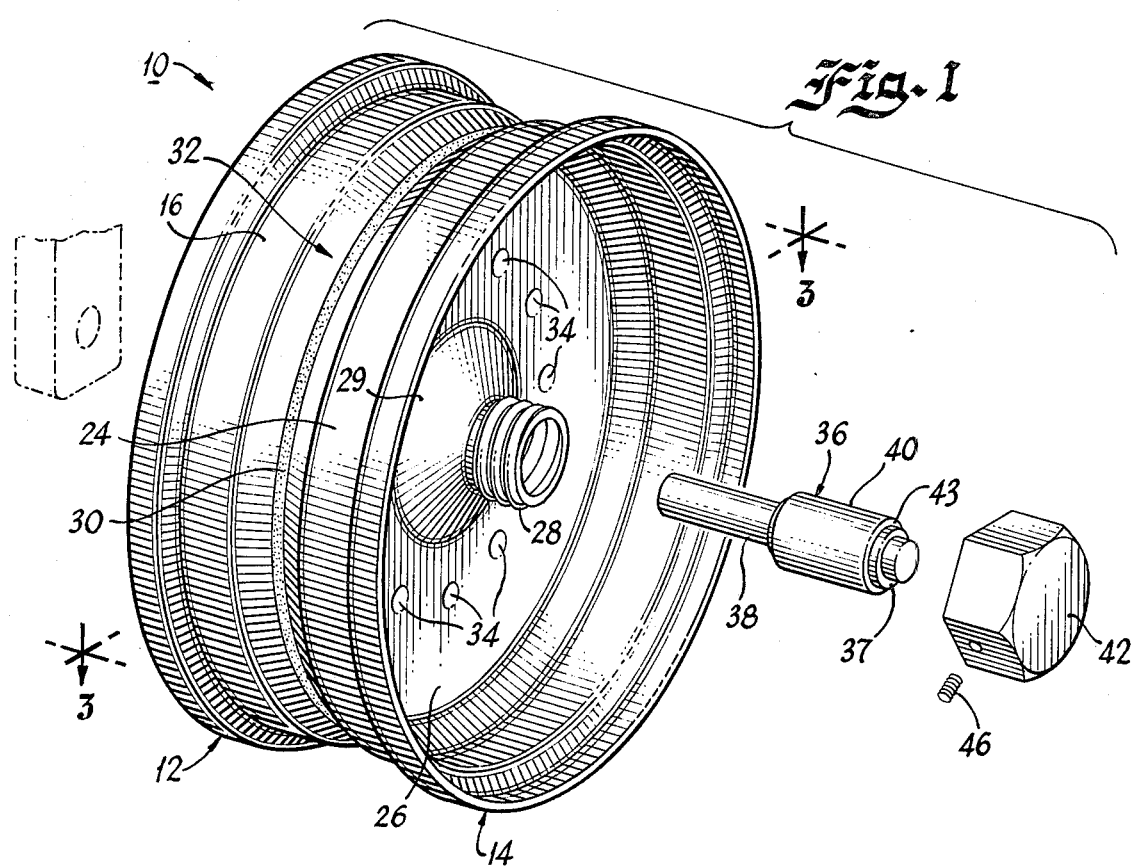
FIG. 1 is an exploded view of an implement wheel constructed in accordance with the principles of the present invention.

Referring now to the drawings and initially to FIG. 1 there is illustrated an implement wheel generally designated by the reference numeral 10. The implement wheel 10 is of the type that may be employed on equipment such as ground-engaging tillage and planting equipment to position the equipment at a desired and consistent height above the ground.

The wheel 10 preferably is fabricated from sheet metal and includes a first wheel half 12 and a second wheel half 14. The first wheel half 12 includes an outer, annular rim portion 16 and an integral interior wall portion 18 shaped at its center to define an annular bearing seat 20 having an L-shaped bearing-contacting cross section. The bearing seat 20 is formed, for example, by stamping the wheel half 12 to include a frusto conical surface 22 on the interior wall 18, having the annular bearing seat 20 extending from the truncated end as an integral extension of the frusto conical surface 22. The annular bearing seat 20 can be shaped to any desired diameter at the interior elbow of the L (FIG. 3) to accommodate a wheel bearing of any desired diameter. A mating second wheel half 14 also includes an outer, annular rim portion 24 and an integral, interior wall portion 26 shaped at its center to extend radially conically outward from the second wheel half portion 14 and is roll threaded to form an externally threaded annular nipple portion 28. The extending externally threaded nipple 28 is formed, for example, by stamping the wheel half 14 to form a frusto conical surface 29 having the integral radially extending annular nipple portion 28 of proper diameter to receive a suitable wheel bearing. The nipple portion 28 extending radially outwardly from the interior wall 26 of wheel half 14 easily can be roll threaded after stamping.

Figure 3:
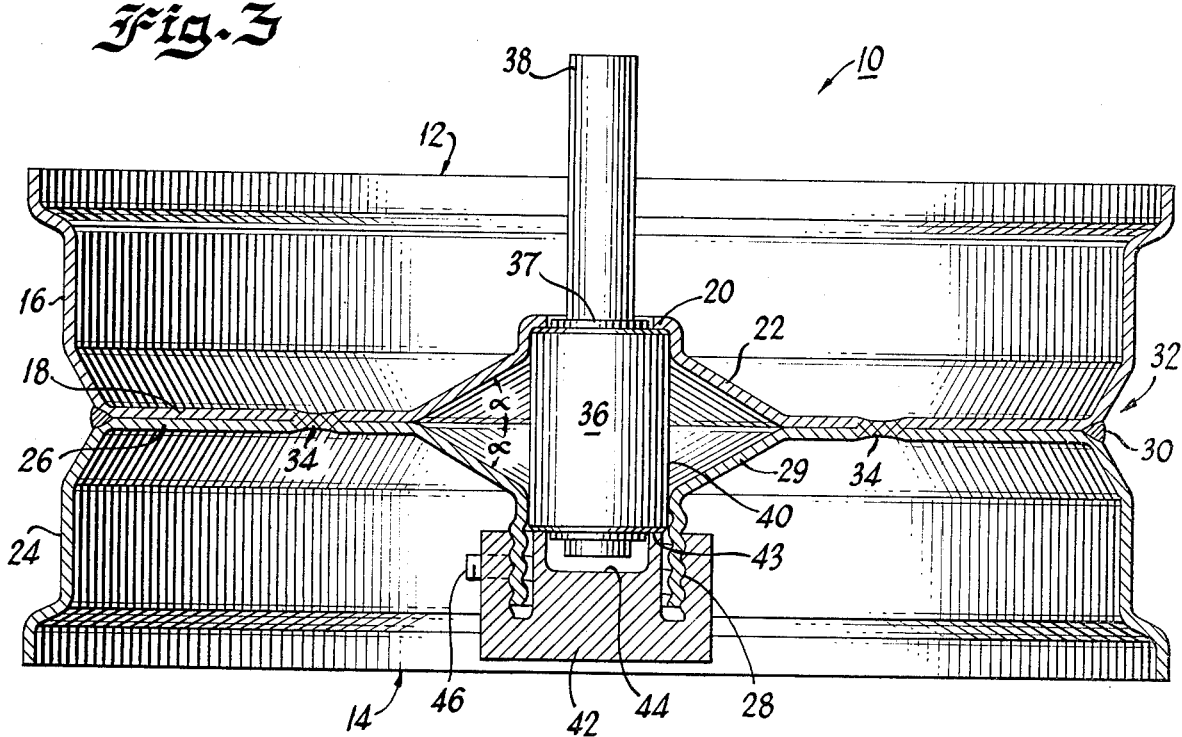
FIG. 3 is a partially elevational, cross-sectional view of the implement wheel constructed in accordance with the principles of the present invention illustrating a roll threaded nipple portion for securing a screw cap thereon.

The two wheel halves 12 and 14 are secured together by a first annular weld 30 entirely encompassing the wheel 10 at a valley 32 defined by the outermost intersection of the interior wall portions 18 and 26 of wheel halves 12 and 14, respectively (FIG. 3). A plurality of spot welds 34 (FIG. 1) are disposed between the outer, continuous weld 30 and the conically shaped central regions 22 and 29 of the interior walls 18 and 26, respectively, so that the two wheel halves 12 and 14 remain permanently secured together. The annular outer weld 30 combines with the inner welds 34 to prevent delamination of the wheel 10, unexpectedly increasing the component strength of the wheel 10 without mechanical fasteners.

A wheel bearing 36 is disposed in the center of the wheel 10 by inserting the wheel bearing 36 from the nipple portion 28 of the second wheel half 14 until the bearing is seated by contacting the annular bearing seat 20. The wheel bearing 36 includes an inner race 37 secured to a shaft or axle 38 and an outer race 40, with ball bearings (not shown) disposed between the inner and outer races 37 and 40 to allow the outer race 40 to rotate together with the wheel 10 about the inner race 37 and axle 38.

In accordance with an important feature of the present invention, the annular bearing seat 20 and the threaded nipple 28 are shaped to contact only the outer bearing race 40 so that the wheel and outer bearing race 40 are free to rotate about the inner race 37 and axle 38. In accordance with another important feature of the present invention, the frusto conical surfaces 22 and 29 stamped in the interior wall portions 18 and 26 of the two wheel halves 12 and 14, respectively, prevent unneeded contact against the outer bearing race 40. Contact is needed only near the two ends of the outer bearing race, as best shown in FIG. 3, particularly since the bearing 36 is centrally disposed within the wheel 10. Additional contact against the outer bearing race 40 would make it more difficult to remove and replace the bearing 36.

In accordance with another important feature of the present invention, the frusto conical surfaces 22 and 29 in the interior wall portions 18 and 26 of wheel halves 12 and 14, respectively are formed at the same angle (FIG. 3) with respect to the internal walls 18 and 26 of the wheel 10 so that the wheel bearing 36 is radially centrally disposed within the wheel 10. It is important that the wheel bearing 36 is radially centrally disposed within the wheel 10, particularly when the wheel bearing 36 is contacted on 30% or less of its outer surface area, as shown in FIG. 3, to maintain balanced stress on the two wheel halves 12 and 14 to avoid wheel half delamination and to prevent the wheel bearing 36 from bending the bearing contacting portions of the wheel halves 12 and 14.

To maintain the bearing 36 precisely and securely within the seat 20, a screw cap 42 is threaded on the roll threads of nipple 28 until the cap 42 engages an outwardly extending annular end 43 of the outer bearing race 40, as shown in FIG. 3. The screw cap 42 includes an internal bore 44 of sufficient diameter to prevent contact of the screw cap 42 against the axle 38 or the inner race 37 when the screw cap is tightened against the outer race 40 of the wheel bearing 36. Once the screw cap 42 is threaded into position, a set screw 46 may be screwed through the cap 42 into engagement against the nipple portion 28 of wheel half 14 to lock the screw cap 42 so that the screw cap 42 does not loosen during usage of the implement wheel 10. As an alternative to the set screw 42, a sealant may be disposed between the exterior surface of the nipple portion 28 and the interior surface of the screw cap 42.

An implement wheel constructed in accordance with the present invention costs less to manufacture since there are no mechanical fasteners, and enables increased productivity because of the time and energy saved in wheel bearing replacement. The particular construction of the bearing seat, as described above, permits a wider range of manufacturing tolerances resulting in a less expensive wheel due to the ability of the screw cap 42, combined with the construction of the bearing seat 20, to precisely position the bearing 36 securely in the bearing seat 20. Further, changing and replacing the bearing 36 is much easier than that of the prior art wheel constructions.

Figure 4:
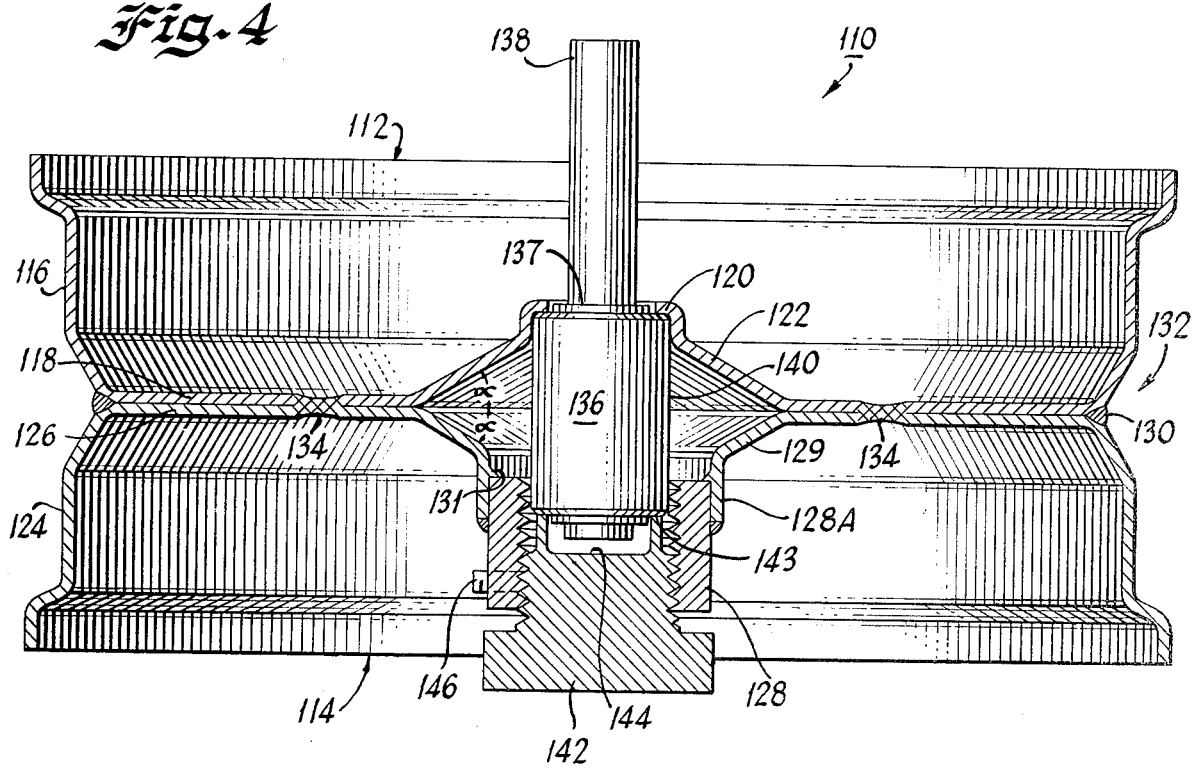
FIG. 4 is a partially elevational, cross-sectional view similar to FIG. 3 illustrating an alternative embodiment of the wheel illustrated in FIG. 3 wherein a threaded boss is secured to the wheel to form an internally threaded nipple portion capable of receiving an externally threaded screw cap.

Referring now to FIG. 4 therein is illustrated an alternative embodiment of an implement wheel generally designated by the reference numeral 110, where like reference numerals have been used to designate similar parts in FIGS. 3 and 4. The implement wheel 110 includes two wheel halves 112 and 114. One wheel half 112 is constructed exactly the same as the wheel half 12 of the wheel illustrated in FIG. 3. The second wheel half 114 differs from the wheel half 14 in the embodiment illustrated in FIG. 3 in having a different nipple construction for receiving a different screw cap.

Figure 2:
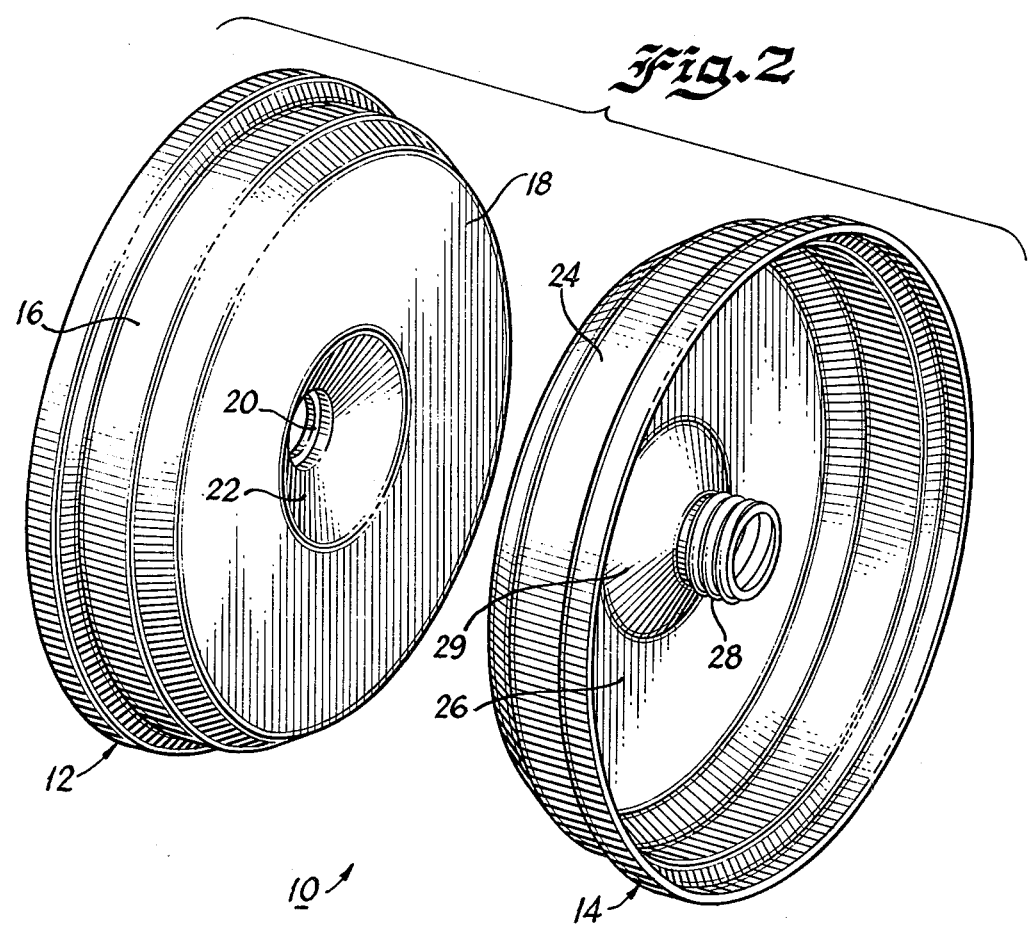
FIG. 2 is a perspective view illustrating two wheel halves constructed in accordance with the principles of the present invention.

In forming a frusto conical surface 129 in the second wheel half 114, similar to the embodiment shown in FIG. 3, the frusto conical surface 129 is made at the same angle as the frusto conical surface 122 in the wheel half 112, but the frusto conical surface 129 does not extend to the same internal diameter as the bearing seat 120. Instead, an integral radially extending annular nipple support member 128A is formed in the internal wheel half wall 126, and a separate, threaded boss or nipple 128 is welded to the inner annular surface of the nipple support 128A. In the embodiment illustrated in FIG. 4, the extending boss or nipple 128 is internally threaded and the nipple support member 128A includes an integral annular stop 131 for easy positioning of the nipple 128 within the support member 128A for welding purposes in manufacture. The first and second wheel halves 112 and 114 are secured together by weld 130 in valley 132 and welds 134 substantially the same as the welds 30 and 34 in the wheel 10 of the first embodiment illustrated in FIGS. 1-3. The screw cap 142 shown in FIG. 4 is constructed with external threads and includes an internal bore 144 to prevent contact of the screw cap 144 against the axle 138 or the internal bearing race 137. The screw cap contacts only the exterior end 143 of the outer bearing race 140 so that the wheel 110, screw cap 142 and outer bearing race 140 can rotate in unison about the axle 138 and inner bearing race 137.

Thereafter, a set screw 146 or suitable thread sealant may be employed to secure the screw cap 142 in position, as explained with reference to FIG. 3.

What is claimed and desired to be secured by Letters Patent of the United States is:

1. An implement wheel comprising:
    a first wheel half having an outer annular rim with a valley portion and having an integral interior wall shaped at its center to define a frusto-conical surface whose truncated end provides an annular bearing seat and whose conical surface merges into the circular plate portion of said interior wall;
    a second wheel half having an outer annular rim with a valley portion, an integral interior wall portion shaped at its center to define a conical surface having an angle of inclination equal to the angle of inclination of the conical surface of said first wheel half, and an axially extending nipple;
    said first and second wheel halves being secured together by a weld in said valley portion;
    a bearing having one end installed in said bearing seat; and
    a bearing engagement member threadedly secured to said nipple for engaging the other end of said bearing and holding said bearing in said bearing seat.

2. The wheel defined in claim 1, wherein said axially extending nipple comprises an axially extending threaded roll portion integrally formed with conical surface of said interior wall portion of said second wheel half and wherein said bearing engagement member comprises a screw cap threadedly mounted on said threaded roll portion.

3. The wheel defined in claim 2, further comprising a set screw in said screw cap adapted to engage said nipple.

4. The wheel defined in claim 1, wherein said axially extending nipple comprises an annular nipple support member having an integral circular stop and threaded annular boss secured within said nipple support member and abutting against said stop.

* * * * *